United States Patent
Gray et al.

(10) Patent No.: US 9,366,536 B2
(45) Date of Patent: Jun. 14, 2016

(54) METHOD AND APPARATUS FOR PRODUCING FIBER OPTIC GYROSCOPE SENSING COIL USING B-STAGE ADHESIVE COATED OPTICAL FIBER

(71) Applicant: Honeywell International Inc., Morristown, MN (US)

(72) Inventors: Charlie Gray, Sioux Falls, SD (US); Stan Kopacz, Phoenix, AZ (US); William R. Schulzetenberg, Glendale, AZ (US); Michael D. Sardinha, Glendale, AZ (US); Joseph M. Rivera, Glendale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 412 days.

(21) Appl. No.: 13/741,963

(22) Filed: Jan. 15, 2013

(65) Prior Publication Data

US 2014/0198318 A1 Jul. 17, 2014

(51) Int. Cl.
G02B 6/02 (2006.01)
G01C 19/72 (2006.01)
G02B 6/44 (2006.01)

(52) U.S. Cl.
CPC ............ G01C 19/72 (2013.01); G02B 6/02395 (2013.01); G02B 6/4457 (2013.01)

(58) Field of Classification Search
None
See application file for complete search history.

(56) References Cited

U.S. PATENT DOCUMENTS

| 3,396,356 | A |   | 8/1968 | Whipple |
|---|---|---|---|---|
| 3,948,829 | A | * | 4/1976 | Babayan ................ C08G 18/69 524/313 |
| 4,082,634 | A |   | 4/1978 | Chang |
| 4,494,436 | A |   | 1/1985 | Kruesi |
| 5,011,262 | A |   | 4/1991 | Layton |
| 5,021,259 | A |   | 6/1991 | Singelyn |
| 5,064,490 | A | * | 11/1991 | Chapin ................ G02B 6/4457 156/169 |
| 5,194,112 | A | * | 3/1993 | Allan ..................... B65H 55/00 156/166 |
| 5,220,632 | A |   | 6/1993 | LoStracco |
| 5,351,900 | A |   | 10/1994 | Torney |
| 5,700,341 | A | * | 12/1997 | Steelman ............... B65H 71/00 156/169 |
| 5,756,165 | A | * | 5/1998 | Ali ......................... C03C 25/26 427/163.2 |
| 5,781,301 | A | * | 7/1998 | Ruffin .......................... 356/465 |
| 6,007,258 | A |   | 12/1999 | Marchitto et al. |
| 6,782,182 | B2 |   | 8/2004 | Dautartas et al. |
| 7,078,843 | B2 |   | 7/2006 | Du et al. |
| 7,313,310 | B2 |   | 12/2007 | Gray et al. |
| 7,477,806 | B2 | * | 1/2009 | Williams ........................ 385/12 |

(Continued)

FOREIGN PATENT DOCUMENTS

| EP | 0391557 | 10/1990 |
|---|---|---|
| EP | 0895061 | 2/1998 |
| WO | 2011116050 | 9/2011 |

OTHER PUBLICATIONS

European Patent Office, "European Search Report from EP Application No. 13196338.1 mailed Feb. 24, 2014", "from Foreign Counterpart of U.S. Appl. No. 13/741,963", Feb. 24, 2014, pp. 14, Published in: EP.

(Continued)

*Primary Examiner* — Sung Pak
(74) *Attorney, Agent, or Firm* — Fogg & Powers LLC

(57) ABSTRACT

An optical fiber with a b-stageable hybrid adhesive coating includes an optical fiber and an outer jacket. The outer jacket includes at least one layer that includes a partially cured b-stageable hybrid adhesive.

19 Claims, 6 Drawing Sheets

(56) References Cited

U.S. PATENT DOCUMENTS

| | | | |
|---|---|---|---|
| 7,528,520 B2 | 5/2009 | Du et al. | |
| 8,958,074 B1* | 2/2015 | Xu | 356/465 |
| 2002/0106173 A1* | 8/2002 | Stupak et al. | 385/128 |
| 2006/0226729 A1 | 10/2006 | Du et al. | |
| 2012/0068708 A1 | 3/2012 | Camp | |
| 2013/0012620 A1* | 1/2013 | Dershem | 523/400 |

OTHER PUBLICATIONS

European Patent Office, "European Search Report from EP Application No. 13198675.4 mailed Feb. 24, 2014", "from Foreign Counterpart of U.S. Appl. No. 13/741,963 ", Feb. 24, 2014, pp. 14, Published in: EP.

European Patent Office, "Office Action from EP Application No. 13198675.4 mailed Mar. 11, 2014", "from Foreign Counterpart of U.S. Appl. No. 13/741,963", Mar. 11, 2014, pp. 14, Published in: EP.

European Patent Office, "Office Action from EP Application No. 13196338.1 mailed Mar. 12, 2014", "from Foreign Counterpart of U.S. Appl. No. 13/741,963", Mar. 12, 2014, pp. 13, Published in: EP.

European Patent Office, "Communication Under Rule 71(3) from EP Application No. 13196338.1 mailed Feb. 2, 2015", "from Foreign Counterpart of U.S. Appl. No. 13/741,963", Feb. 2, 2015, pp. 125, Published in: EP.

European Patent Office, "Communication Under Rule 71(3) from EP Application No. 13198675.4 mailed Jan. 28, 2015", "from Foreign Counterpart of U.S. Appl. No. 13/741,963", Jan. 28/2015, pp. 125, Published in: EP.

* cited by examiner

METHOD AND APPARATUS FOR PRODUCING FIBER OPTIC GYROSCOPE SENSING COIL USING B-STAGE ADHESIVE COATED OPTICAL FIBER

BACKGROUND

Current fiber coating techniques apply a soft inner coat material to protect against micro-cracks and a rigid outer layer to offer handling protection. In the fabrication of fiber optic gyroscope sensing coils, a third adhesive layer is applied for coil bonding. Once the adhesive layer is applied, the entire sensing coil assembly is fused under heat and pressure. The process results in a single monolithic coil.

The protective and adhesive coating materials have a high coefficient of thermal expansion relative to the fiber itself. This results in the coating materials expanding and contracting to a greater degree than the fiber when exposed to temperature changes while in service or testing. The thermal expansion can therefore have an adverse effect on the performance of the sensing coil.

The fabrication of sensing coils currently utilizes two different kinds of adhesive materials, a "wet" adhesive material process and "dry" adhesive material process. The wet process provides superior strength, ruggedness, and adhesive crosslinking when compared to the dry process, yielding better physical performance of the sensing coil. The dry process, however, provides more favorable manufacturing characteristics, such as ease of handling and winding.

For example, dry adhesives, such as fused thermoplastic coating, allows a fiber to be pre-impregnated, and the pre-impregnated fiber can be wound at a later time, and set the adhesive. In contrast, wet adhesives, such as resins and epoxies, are applied to the fibers before winding and the fibers must be formed into the desired coil shape. The wet adhesive begins to set thereafter even without necessarily needing to apply heat. Therefore, wet adhesives have a limited pot life and the process affords less flexibility than the dry process, as interrupting or delaying winding process creates difficulties with wet adhesive begins to set.

SUMMARY

An exemplary optical fiber with a b-stageable hybrid adhesive coating includes an optical fiber and an outer jacket. The outer jacket includes at least one layer that includes a partially cured b-stageable hybrid adhesive.

DRAWINGS

Understanding that the drawings depict only exemplary embodiments and do not limit the scope of the invention, the exemplary embodiments will be described with additional specificity and detail through the use of the accompanying drawings, in which.

Figure 1A:
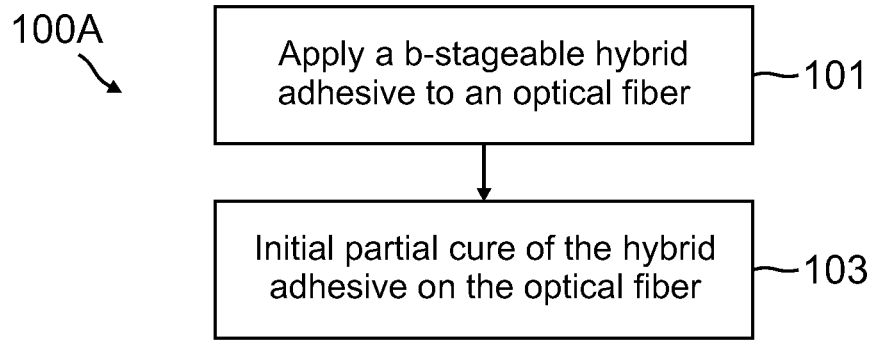
FIG. 1A is a flow diagram depicting an exemplary embodiment of a method according to the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The embodiments of the present invention relate to a methodology for producing a fiber optic gyroscope sensing coil. The invention provides a method of producing such sensing coil with the ease of handling and winding of a dry adhesive process, and the superior physical performance of the wet adhesive process resulting in a more highly cross-linked adhesive with more strength and ruggedness than with the dry process. The claimed subject matter is described with reference to the drawings, wherein like reference numerals are used to refer to like elements throughout. In the following description, for purposes of explanation, numerous specific details and examples are set forth in order to provide a thorough understanding of the embodiments of the present invention.

FIG. 1A is a flow diagram depicting exemplary method 100A for producing an optical fiber with a b-stageable hybrid adhesive coating. B-stageable refers to a characteristic of the adhesive coating that allows it to be cured in a two-stage process allowing the adhesive to be kept for a period of time before completely curing it. The first stage of curing (initial cure) results in a partial cure of the b-stageable hybrid adhesive, which allows the b-stageable hybrid adhesive to remain on an optical fiber without requiring an immediate full cure. This allows easier handling and manipulation of the optical fiber. Once the fiber is wound into a fiber optic gyroscope (FOG) sensing coil, the adhesive then undergoes a "final" cure which completes the curing process. This two-step curing allows "staging" of the FOG sensing coil manufacturing process. In exemplary embodiments, the curing process can involve multiple steps and is not limited to solely two steps. For example, an intermediate curing step may be utilized, after the initial cure, but before the final cure.

First, at block 101, a b-stageable hybrid adhesive is applied to the optical fiber. The b-stageable hybrid adhesive has characteristics that provide: (1) after an initial cure, the b-stageable hybrid adhesive provides the ease of handling and winding of a dry adhesive; and (2) after a final cure, the b-stageable hybrid adhesive provides the crosslinking, strength, and physical performance of a wet adhesive. In one embodiment, the b-stageable hybrid adhesive is UV (ultraviolet) curable, in addition to being thermal curable. In other embodiments, the b-stageable hybrid adhesive need not strictly be UV curable. In some exemplary embodiments, the b-stageable hybrid adhesive can be initially cured by other forms of energy, such as different types of electromagnetic energy like microwave, electron beam, or other radiation sources; or through preliminary thermal curing. In another embodiment, the b-stageable hybrid adhesive can be applied over different coating layers as part of a jacket coating the optical fiber. In exemplary embodiments, this includes applying the b-stageable hybrid adhesive over a layer of different material coating the optical fiber, over multiple layers of different materials coating the optical, or directly on the fiber.

At block 103, the b-stageable hybrid adhesive, now on the optical fiber, goes through an initial cure. The initial curing process can be accomplished using the different methods available to cure the b-stageable hybrid adhesive. Once the initial partial curing is complete, it keeps the b-stageable hybrid adhesive in place on the optical fiber and prevents the b-stageable hybrid adhesive from coming off during the manufacturing process. In one embodiment, the b-stageable hybrid adhesive responds quicker to the initial partial curing than the final cure. For example, with a UV curable b-stageable hybrid adhesive, the b-stageable hybrid adhesive can cure around 100 times faster with a UV cure than with a conventional oven thermal cure. The partially cured optical fiber is now ready for winding.

Figure 1B:
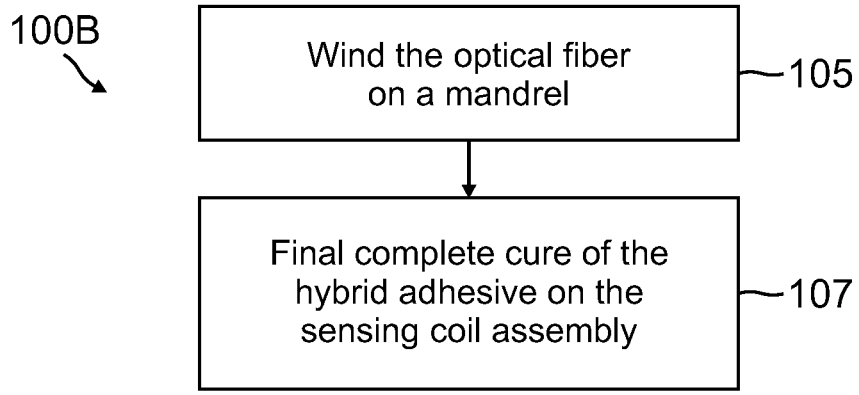
FIG. 1B is a flow diagram depicting an exemplary embodiment of a method according to the present disclosure.

FIG. 1B is a flow diagram depicting exemplary method 100B for producing a fiber optic gyroscope sensing coil. At block 105, an optical fiber with a b-stageable hybrid adhesive that has undergone an initial cure, such as the partially cured optical fiber created in exemplary method 100A described above, is wound on a mandrel into the desired shape and pattern necessary for the sensing coil. In one embodiment, the partially cured optical fiber can be wound into a substantially circular cylindrical shape on the mandrel. The optical fiber can be wound into the necessary shapes and patterns, depending on the application. In exemplary embodiments, other patterns and shapes may be used, such as elliptical cylindrical shapes, or others. The sensing coil assembly is then ready for a final cure.

At block 107, the sensing coil assembly receives a final cure, completely curing the b-stageable hybrid adhesive. The final cure gives the b-stageable hybrid adhesive the strength and highly cross-linked characteristics found in wet adhesives. In one embodiment, the final complete curing of the b-stageable hybrid adhesive on the optical fiber can be accomplished through a conventional thermal cure. In other embodiments, the final cure can be accomplished through other means known to those having ordinary skill in the art.

The b-stageable hybrid adhesive can be applied to the optical fiber through conventional methods already used in the manufacture of optical fibers, or through other methods known to those having ordinary skill in the art. In one exemplary embodiment, the b-stageable hybrid adhesive can be applied to the optical fiber through an inking process.

Figure 2:
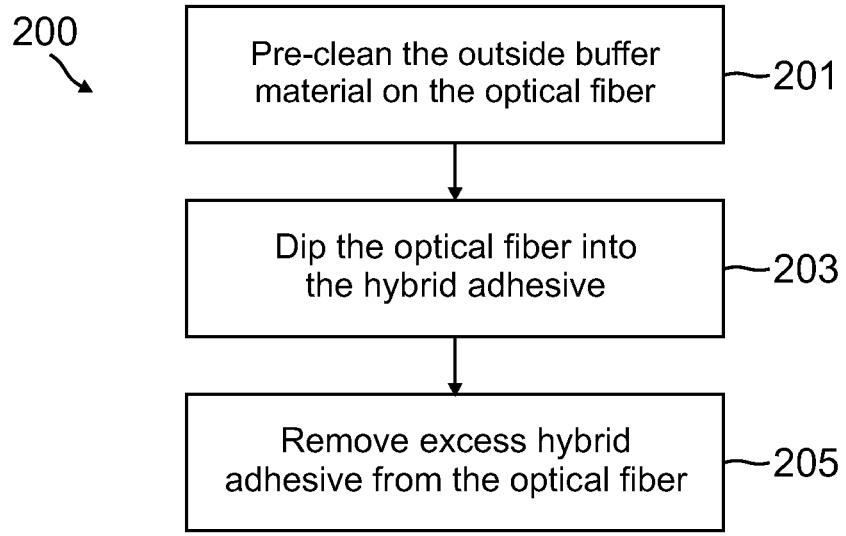
FIG. 2 is a flow diagram depicting an exemplary embodiment of an inking process according to the present disclosure.

FIG. 2 is a flow diagram depicting an exemplary embodiment of an inking process 200 according to the present disclosure. At block 201, the optical fiber is initially cleaned. In one embodiment, the optical fiber may have an outside buffer material that is cleaned rather than the glass core of the optical fiber itself. In one embodiment, cleaning can be accomplished through an atmospheric pressure plasma cleaning process. Next, at block 203, the optical fiber is dipped into the b-stageable hybrid adhesive. In other embodiments, the fiber does not have to be "dipped" into the b-stageable hybrid adhesive, and that the b-stageable hybrid adhesive can be applied through other methods. In some embodiments, the b-stageable hybrid adhesive is applied in an inking tower. Then, at block 205, the excess b-stageable hybrid adhesive is removed from the optical fiber. In one embodiment, this can be accomplished through the use of a flexible die. The optical fiber is passed through the flexible die, which removes excess b-stageable hybrid adhesive from the optical fiber. In another embodiment, a rigid die, as is used in wire insulation applications, can be used.

Figure 3:
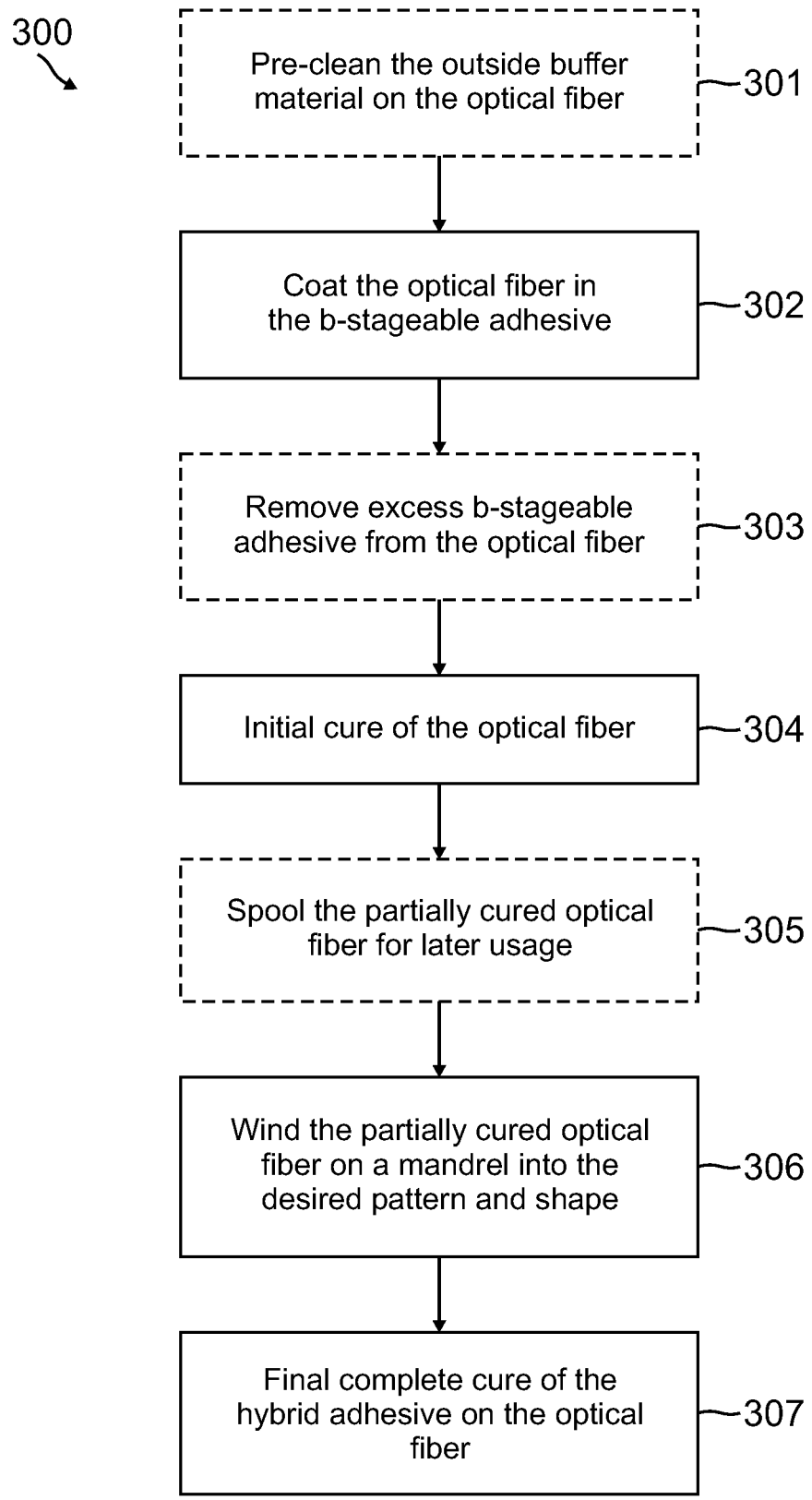
FIG. 3 is a flow diagram depicting an exemplary embodiment of a manufacturing process according to the present disclosure.

FIG. 3 illustrates a flow diagram of the manufacturing process according to one embodiment of the invention 300. At optional block 301, the outside buffer material on the optical fiber is cleaned. At block 302, the optical fiber is coated in the b-stageable hybrid adhesive. At optional block 303, the excess b-stageable hybrid adhesive is removed from the optical fiber. In some embodiments, the excess b-stageable hybrid adhesive can be removed using a flexible or rigid die. At block 304, the optical fiber is then initially cured. The initial cure results in partial curing of the b-stageable hybrid adhesive. At optional block 305, the partially cured optical fiber is spooled. This way, the partially cured optical fiber can be stored and transported for later use. This affords flexibility in the winding process when it comes to breaks and delays in the manufacturing process. At block 306, the partially cured optical fiber is wound onto a mandrel in the desired pattern and shape. At block 307, the sensing coil assembly on the mandrel is thermally cured, thus completing the curing process of the b-stageable hybrid adhesive on the optical fiber. In exemplary embodiments, the final curing can occur through other curing means depending on the properties of the adhesive in use.

Figure 4A:
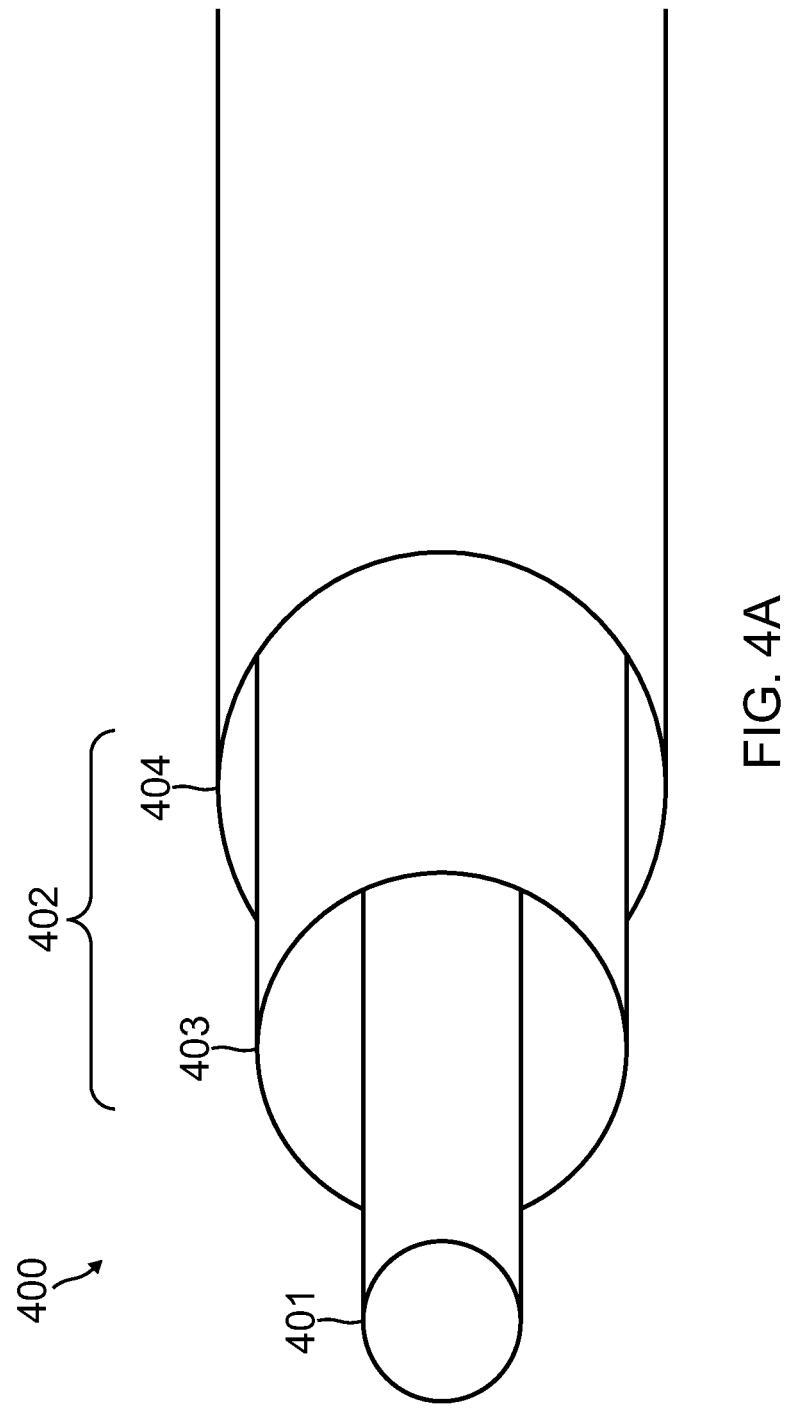
FIGS. 4A-4C are block diagrams depicting exemplary embodiments of optical fibers and jackets according to the present disclosure.

FIG. 4A illustrates an exemplary embodiment of an optical fiber 400 including an optical fiber core 401 and a two layer outer jacket 402. Optical fiber core 401 is covered by the two layer outer jacket 402. The two layer outer jacket 402 includes an inner soft buffer layer 403 and a b-stageable hybrid adhesive layer 404. The inner soft buffer layer 403 provides cushioning to the optical fiber, prevents environmental influences from affecting the signal in the fiber, and causes light to be confined to the core. Soft, in this context, is relative to the b-stageable hybrid adhesive layer 404 in terms of providing more flexibility and less resistance to physical manipulation of the optical fiber than the b-stageable hybrid adhesive layer 404. In some embodiments, the inner soft buffer layer 403 comprises an acrylate buffer material. In other embodiments, other materials may be substituted as an inner soft buffer layer 403. The b-stageable hybrid adhesive layer 404 encases both soft buffer layer 403 and optical fiber core 401. The b-stageable hybrid adhesive layer 404 comprises the outer layer of the two layer outer jacket 402 of the optical fiber 400. The b-stageable hybrid adhesive layer 404 is partially cured so as to comprise a protective outer layer to offer protection against handling and environmental effects.

Figure 4B:
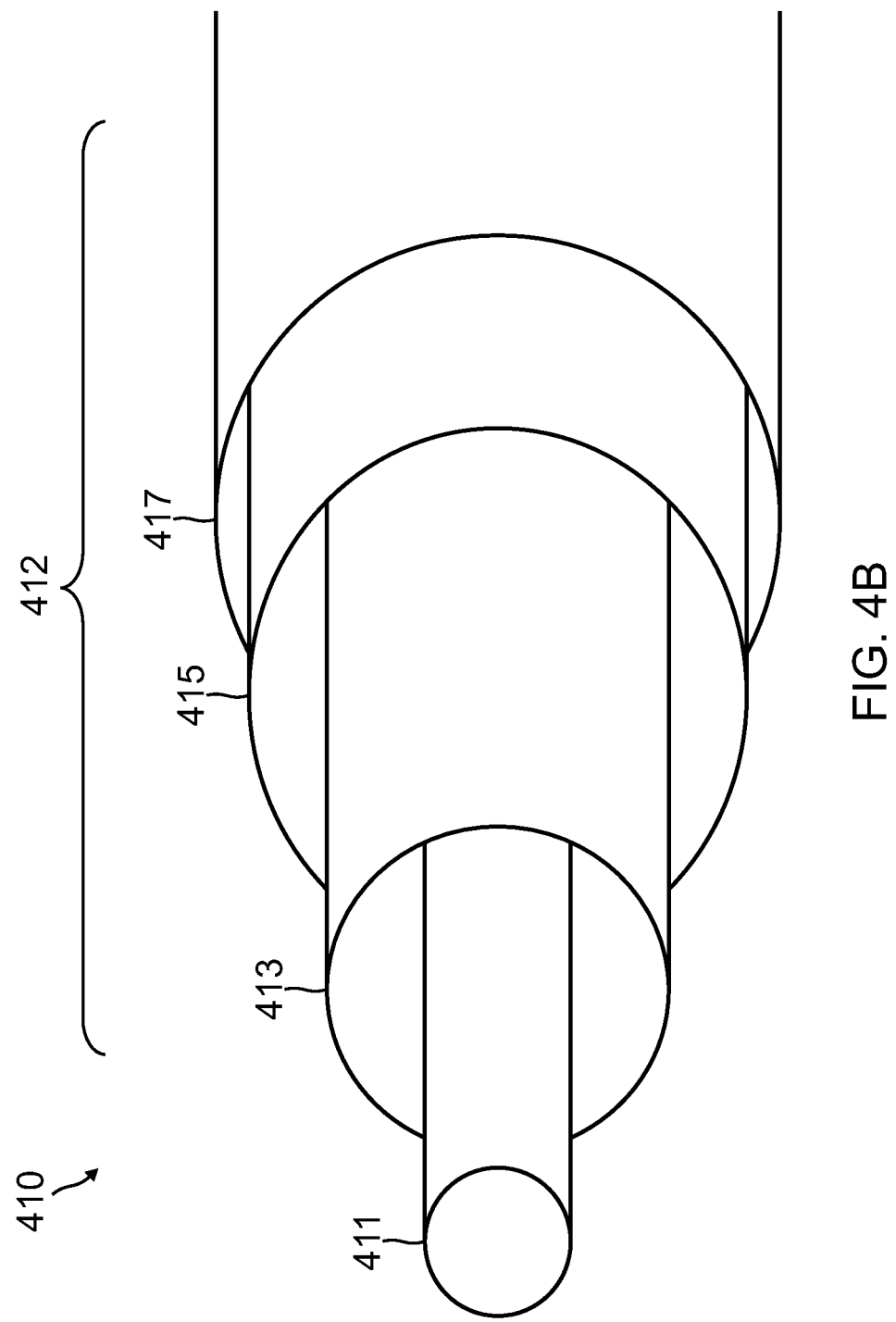

FIG. 4B illustrates an exemplary embodiment of an optical fiber 410 including an optical fiber core 411 and a three layer outer jacket 412. Optical fiber core 411 is covered by the three layer outer jacket 412. The three layer outer jacket 412 includes an inner soft buffer layer 413, a protective outer buffer layer 415, and a b-stageable hybrid adhesive layer 417. In this exemplary embodiment, the inner soft buffer layer 413 is the innermost layer applied directly to the optical fiber core 411. The protective outer buffer layer 415 encases the inner soft buffer layer 413. In this context, soft refers to the greater flexibility and less resistance offered by the inner soft buffer layer to physical manipulation of the optical fiber than the protective outer buffer layer. In one embodiment, the protective outer buffer layer 415 comprises an acrylate buffer material with greater durability than the softer buffer acrylate material. In other embodiments, other formulations and alternative materials with different characteristics may be used for the protective outer buffer layer 415. A b-stageable hybrid adhesive layer 417 comprises the outermost layer, encasing protective outer buffer layer 415. The b-stageable hybrid adhesive layer 417 is partially cured so as to provide ready handling. In one embodiment, this optical fiber with b-stageable hybrid adhesive coating can be readily wound onto a mandrel and finally cured to form a fiber optic gyroscope sensing coil. While FIG. 4B only shows three layers in the three layer outer jacket 412, it is understood that additional layers may be included in other embodiments.

Figure 4C:
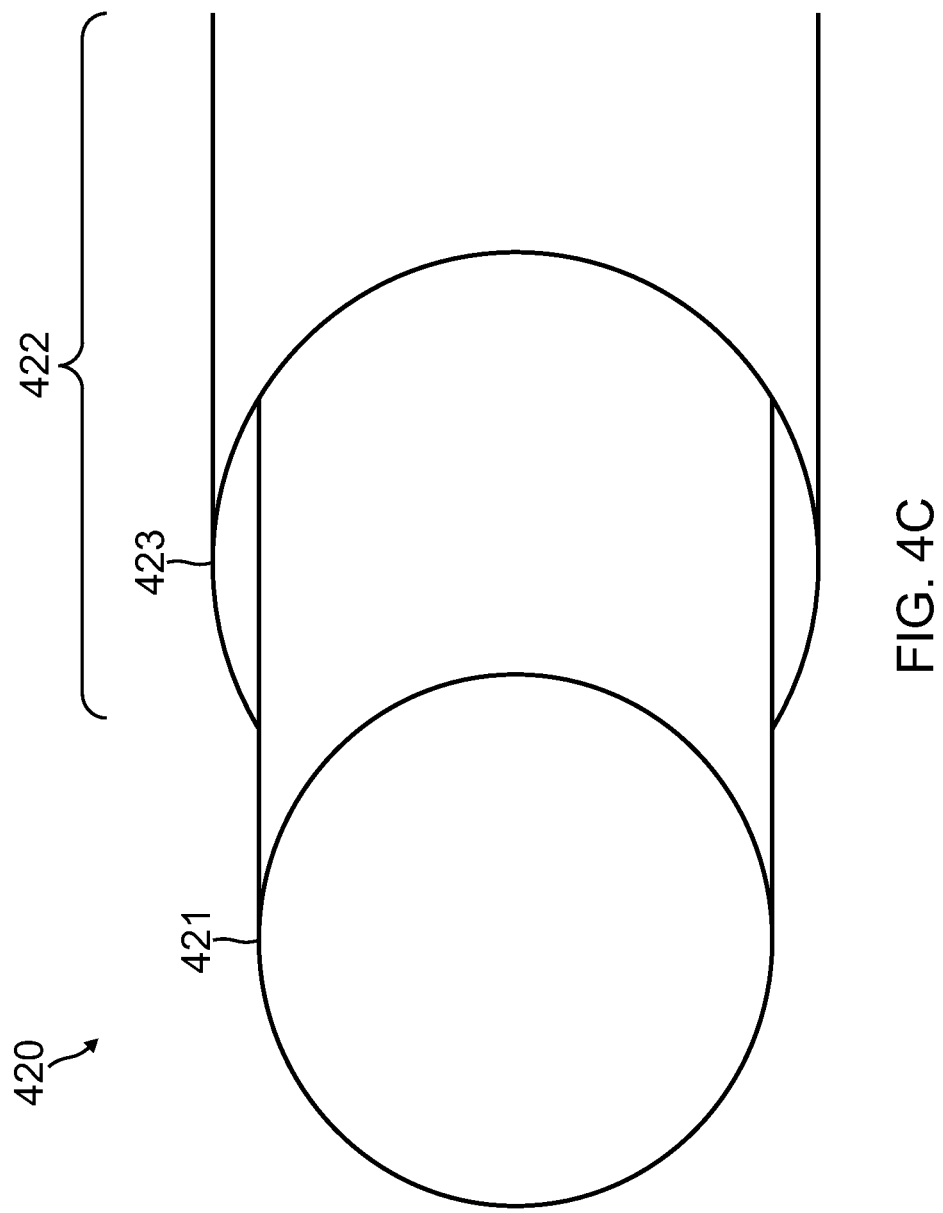

FIG. 4C, illustrates another exemplary embodiment of an optical fiber 420 including an optical fiber core 421 and a single layer outer jacket 422. Optical fiber core 421 is covered by the single layer outer jacket 422. The single layer outer jacket 422 includes a b-stageable hybrid adhesive coating 423 that is applied directly to the optical fiber 421. The b-stageable hybrid adhesive coating 423 is partially cured so as to provide ready handling. This minimizes the number dissimilar material interfaces, thus reducing thermally induced stresses on the optical fiber. In exemplary embodiments, the b-stageable hybrid adhesive can be applied to the fiber using existing manufacturing techniques, or through alternative means. In one embodiment, this optical fiber with b-stageable hybrid adhesive coating can be readily wound onto a mandrel and finally cured to form a fiber optic gyroscope sensing coil.

Figure 5:
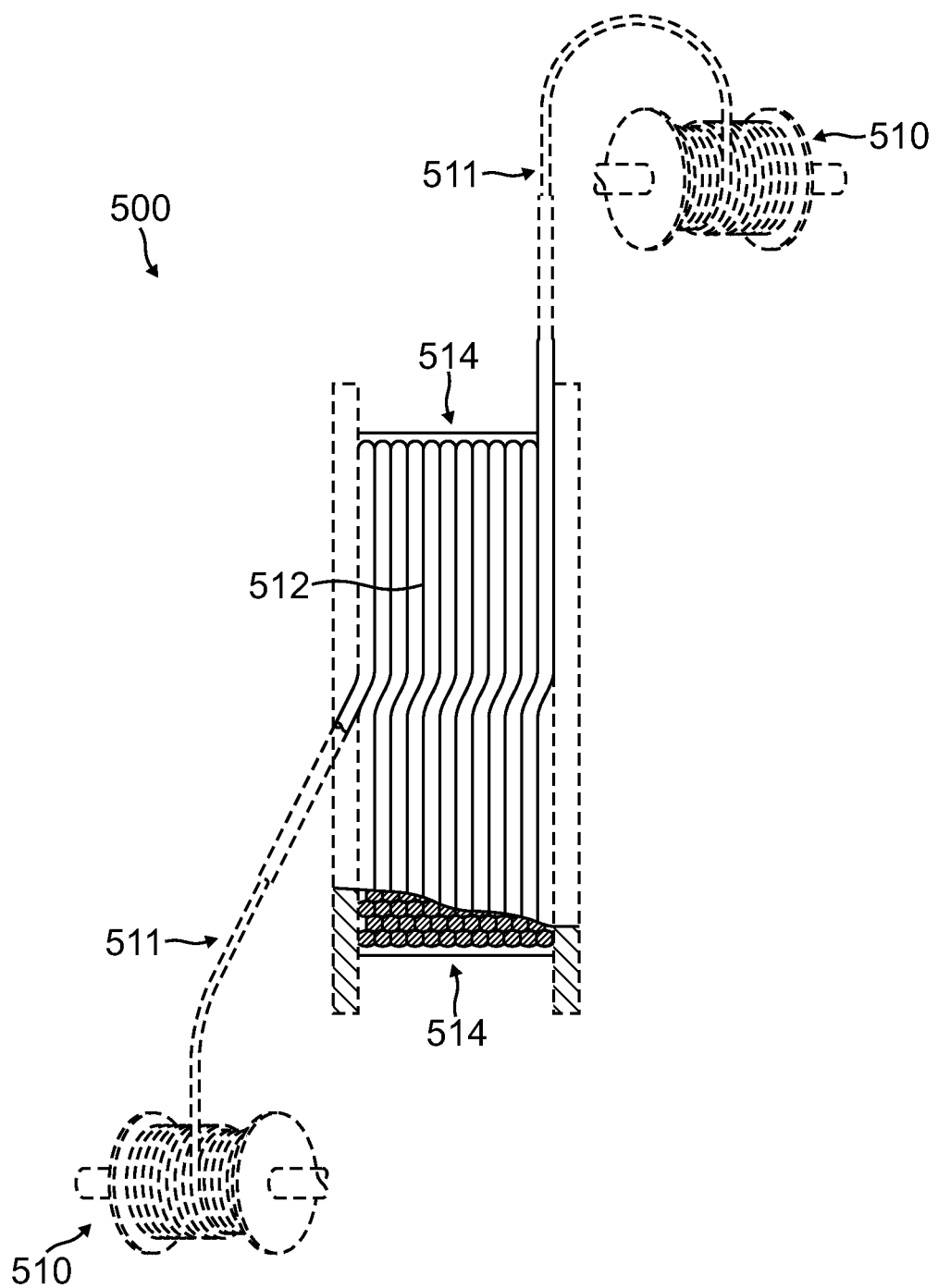
FIG. 5 is a diagram depicting a b-staged fiber optic gyroscope sensing coil according to the present disclosure.

FIG. 5 illustrates an exemplary embodiment of manufacturing a b-staged fiber optic gyroscope sensing coil 500. In this embodiment, two spools 510 of optical fiber with a b-stageable hybrid adhesive coating 511 that has been initially cured are used to wind sensing coil 512 onto a mandrel 513. In other embodiments, a single spool or more than two spools of optical fiber are used to wind the sensing coil 512. In exemplary embodiments, the amount of spools used for winding is dependent on the winding pattern used. Various winding patterns can be used, depending on the application, and the pattern displayed in the figure is not the only winding pattern that can be used. Once the desired length of fiber 511 has been wound into the sensing coil 512, the sensing coil can be finally cured. In one embodiment, this is accomplished through a thermal curing process. Once cured, the b-stageable hybrid adhesive 514 coating on each fiber form highly cross-linked bonds and result in a monolithic sensing coil structure.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

Example Embodiments

Example 1 includes an optical fiber with a b-stageable hybrid adhesive coating comprising: an optical fiber; an outer jacket; wherein the outer jacket comprises at least one layer; wherein the at least one layer comprises a partially cured b-stageable hybrid adhesive.

Example 2 includes the optical fiber of Example 1, wherein the outer jacket further comprises: a soft inner layer coating applied directly on the optical fiber, the soft inner layer positioned between the optical fiber and the partially cured b-stageable hybrid adhesive; and wherein the partially cured b-stageable hybrid adhesive is the outermost layer of the outer jacket.

Example 3 includes the optical fiber of any of Examples 1-2, wherein the outer jacket further comprises: a soft inner layer coating applied directly on the optical fiber; a hard protective layer of acrylate coating, the hard protective layer positioned between the soft inner layer and the partially cured b-stageable hybrid adhesive, wherein soft inner layer is positioned between the optical fiber and the hard protective layer; and wherein the partially cured b-stageable hybrid adhesive is the outermost layer of the outer jacket.

Example 4 includes the optical fiber of any of Examples 1-3, wherein the partially cured b-stageable hybrid adhesive is applied directly on the optical fiber.

Example 5 includes a method comprising the steps of: coating an optical fiber with a b-stageable hybrid adhesive; and partially curing the b-stageable hybrid adhesive; wherein partially curing the b-stageable hybrid adhesive is only one step of a multiple-step complete curing process.

Example 6 includes the method of Example 5, wherein partial curing is accomplished using electromagnetic energy.

Example 7 includes the method of Example 6, wherein the electromagnetic energy is at least one of ultraviolet light, an electron beam, and microwave energy.

Example 8 includes the method of any of Examples 5-7, wherein the b-stageable hybrid adhesive is highly UV curable.

Example 9 includes the method of any of Examples 5-8, wherein partial curing is accomplished using a thermal curing process.

Example 10 includes the method of any of Examples 5-9, wherein the b-stageable hybrid adhesive is applied using an inking process.

Example 11 includes the method of Example 10, wherein the inking process takes place inside of an inking tower.

Example 12 includes the method of any of Examples 5-11, wherein the b-stageable hybrid adhesive is applied using an inking process comprises the steps of: pre-cleaning outside buffer material on the optical fiber; dipping the optical fiber into the b-stageable hybrid adhesive; and removing excess b-stageable hybrid adhesive from the optical fiber.

Example 13 includes the method of Example 12, wherein the pre-cleaning step is performed by atmospheric pressure plasma cleaning.

Example 14 includes the method of any of Examples 12-13, wherein the excess b-stageable hybrid adhesive is removed by using at least one of a flexible die and a rigid die.

Example 15 includes the method of any of Examples 5-14, further comprising: spooling the optical fiber coated in the partially cured b-stageable hybrid adhesive after partially curing.

Example 16 includes the method of any of Examples 5-15, further comprising: winding the optical fiber coated in the partially cured b-stageable hybrid adhesive onto a mandrel; and completely curing the b-stageable hybrid adhesive on the optical fiber.

Example 17 includes a fiber optic gyroscope sensing coil, comprising: a finally cured b-stageable hybrid adhesive coated optical fiber wound into a coil; wherein the finally cured b-stageable hybrid adhesive is cross-linked after final curing; and wherein the b-stageable hybrid adhesive coated optical fiber of the coil was separable and malleable before final curing.

Example 18 includes the sensing coil of Example 17, wherein the sensing coil is a monolithic structure.

Example 19 includes the sensing coil of any of Examples 17-18, wherein b-stageable hybrid adhesive coating forms a protective coat after final curing.

Example 20 includes a method of producing a fiber optic gyroscope sensing coil comprising the steps of: winding a partially cured b-stageable hybrid adhesive coated optical fiber on a mandrel; and completely curing the b-stageable hybrid adhesive on the optical fiber.

Example 21 includes the method of Example 20, further comprising: coating the optical fiber with a b-stageable hybrid adhesive prior to winding; and partially curing the b-stageable hybrid adhesive prior to winding.

Example 22 includes the method of any of Examples 20-21, wherein the optical fiber is wound into a substantially circular cylindrical shape.

Example 23 includes the method of any of Examples 20-22, wherein the complete cure results in a monolithic fiber optic gyroscope sensing coil.

Example 24 includes the method of any of Examples 20-23, wherein the complete cure is accomplished through thermal curing.

Example 25 includes the method of any of Examples 20-24, wherein the b-stageable hybrid adhesive is a highly cross-linked polymer after completely curing the b-stageable hybrid adhesive.

What is claimed is:

1. An optical fiber with a b-stageable hybrid adhesive coating comprising:
    an optical fiber;
    an outer jacket substantially covering the optical fiber;
    wherein the outer jacket includes a partially cured b-stageable hybrid adhesive as an outermost layer of the outer jacket substantially covering the outer jacket, wherein the b-stageable hybrid adhesive is configured to be:
        (1) initially curable using electromagnetic energy into a separable and malleable partially cured state during a first stage of a two-stage process; and
        (2) finally curable using a thermal curing process into a structure having cross-linked bonds during a second stage of the two-stage process.

2. The optical fiber of claim 1, wherein the outer jacket further comprises:
    a soft inner layer coating applied directly on the optical fiber, the soft inner layer positioned between the optical fiber and the partially cured b-stageable hybrid adhesive; and
    wherein the partially cured b-stageable hybrid adhesive is the outermost layer of the outer jacket.

3. The optical fiber of claim 1, wherein the outer jacket further comprises:
    a soft inner layer coating applied directly on the optical fiber;
    a hard protective layer of acrylate coating, the hard protective layer positioned between the soft inner layer and the partially cured b-stageable hybrid adhesive, wherein soft inner layer is positioned between the optical fiber and the hard protective layer; and
    wherein the partially cured b-stageable hybrid adhesive is the outermost layer of the outer jacket.

4. The optical fiber of claim 1, wherein the partially cured b-stageable hybrid adhesive is applied directly on the optical fiber, wherein the outermost layer of the outer jacket is the only layer of the outer jacket.

5. A method comprising the steps of:
    coating an optical fiber with a b-stageable hybrid adhesive as part of an outermost layer of an outer jacket substantially covering the optical fiber; and
    partially curing the b-stageable hybrid adhesive into a separable and malleable initially cured state using electromagnetic energy during a first stage of a two-stage process;
    wherein partially curing the b-stageable hybrid adhesive is only the first stage of a two-stage complete curing process for the b-stageable hybrid adhesive, wherein the b-stageable hybrid adhesive is configured to be finally curable using a thermal curing process into a structure having cross-linked bonds during a second stage of the two-stage process.

6. The method of claim 5, wherein the electromagnetic energy is at least one of ultraviolet light, an electron beam, and microwave energy.

7. The method of claim 5, wherein the b-stageable hybrid adhesive is highly UV curable.

8. The method of claim 5, wherein the b-stageable hybrid adhesive is applied using an inking process.

9. The method of claim 8, wherein the inking process takes place inside of an inking tower.

10. The method of claim 5, wherein the b-stageable hybrid adhesive is applied using an inking process comprises the steps of:
    pre-cleaning outside buffer material on the optical fiber;
    dipping the optical fiber into the b-stageable hybrid adhesive; and
    removing excess b-stageable hybrid adhesive from the optical fiber.

11. The method of claim 10, wherein the pre-cleaning step is performed by atmospheric pressure plasma cleaning.

12. The method of claim 10, wherein the excess b-stageable hybrid adhesive is removed by using at least one of a flexible die and a rigid die.

13. The method of claim 5, further comprising:
    spooling the optical fiber coated in the partially cured b-stageable hybrid adhesive after partially curing.

14. The method of claim 5, further comprising:
    winding the optical fiber coated in the partially cured b-stageable hybrid adhesive onto a mandrel; and
    finally curing the b-stageable hybrid adhesive on the optical fiber using the thermal curing process resulting in the structure having cross-linked bonds during the second stage of the two-stage process.

15. A fiber optic gyroscope sensing coil, comprising:
    a finally cured b-stageable hybrid adhesive coated optical fiber wound into a cross-linked monolithic fiber optic gyroscope sensing coil, the finally cured b-stageable hybrid adhesive coated optical fiber including an optical fiber and an outer jacket substantially covering the optical fiber, the outer jacket including a finally cured b-stageable hybrid adhesive as an outermost layer of the outer jacket substantially covering the outer jacket;
    wherein the finally cured b-stageable hybrid adhesive of the outermost layer of the outer jacket is cross-linked into the monolithic fiber optic gyroscope sensing coil after final curing using a thermal curing process during a second stage of a two-stage process; and
    wherein the b-stageable hybrid adhesive coated optical fiber of the coil was separable and malleable before final curing and after an initial cure using electromagnetic energy into a partially cured state during a first stage of the two-stage process.

16. The sensing coil of claim 15, wherein b-stageable hybrid adhesive coating forms a protective coat after final curing.

17. A method of producing a fiber optic gyroscope sensing coil comprising the steps of:
    winding a partially cured b-stageable hybrid adhesive coated optical fiber on a mandrel, the partially cured b-stageable hybrid adhesive coated optical fiber including an optical fiber and an outer jacket substantially covering the optical fiber, the outer jacket including a partially cured b-stageable hybrid adhesive as an outermost layer of the outer jacket substantially covering the outer jacket, wherein the b-stageable hybrid adhesive is configured to be initially curable using electromagnetic energy into a separable and malleable partially cured state during a first stage of a two-stage process; and completely curing the b-stageable hybrid adhesive on the optical fiber using a thermal curing process into a monolithic fiber optic gyroscope sensing coil having cross-linked bonds during a second stage of the two-stage process.

18. The method of claim 17, further comprising:

coating the optical fiber with a b-stageable hybrid adhesive prior to winding; and initially curing the b-stageable hybrid adhesive prior to winding using electromagnetic energy into the separable and malleable partially cured state during the first stage of the two-stage process.

19. The method of claim 17, wherein the partially cured b-stageable hybrid adhesive coated optical fiber is wound into a substantially circular cylindrical shape.

* * * * *